United States Patent
Kyrtsos (10) Patent No.: US 6,286,992 B1
(45) Date of Patent: Sep. 11, 2001

(54) AXLE TEMPERATURE MONITOR

(75) Inventor: Christos Kyrtsos, Southfield, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/248,958

(22) Filed: Feb. 12, 1999

(51) Int. Cl.[7] .............................. G01N 25/30; G01K 5/18
(52) U.S. Cl. .................................... 374/45; 374/104
(58) Field of Search .......................... 374/141, 45, 4, 374/101, 102, 103, 104, 106

(56) References Cited

U.S. PATENT DOCUMENTS

| | | | |
|---|---|---|---|
| 3,228,735 | * | 1/1966 | Stewart ............................. 116/208 |
| 4,016,762 | * | 4/1977 | Payne ................................ 374/106 |
| 4,119,284 | * | 10/1978 | Belmont .......................... 246/169 A |
| 4,316,175 | * | 2/1982 | Korber et al. ....................... 340/57 |
| 5,201,483 | * | 4/1993 | Sutnar et al. ....................... 374/124 |
| 5,224,775 | * | 7/1993 | Reading et al. ..................... 374/11 |
| 5,335,994 | * | 8/1994 | Weynant née Girones ......... 374/205 |
| 5,559,494 | * | 9/1996 | Thompson .......................... 340/448 |
| 5,677,667 | * | 10/1997 | Lesesky et al. ..................... 340/431 |
| 5,711,606 | * | 1/1998 | Koether .............................. 374/102 |
| 5,857,776 | * | 1/1999 | Blixt et al. ......................... 374/106 |
| 5,927,384 | * | 7/1999 | Waldner et al. ..................... 165/47 |
| 5,959,365 | * | 9/1999 | Mantini et al. .................... 307/10.1 |

* cited by examiner

Primary Examiner—Diego Gutierrez
Assistant Examiner—Gail Verbitsky
(74) Attorney, Agent, or Firm—Carlson, Gaskey & Olds (57) ABSTRACT

A method of monitoring the temperature of an axle includes the steps of reading temperatures from an axle of a vehicle, comparing the read temperatures with expected temperatures, and sending warning signals when necessary. A temperature sensor may be used to read temperatures of the axle and send temperature signals to a control to perform computations and compare the computations with expected temperatures. Furthermore, the control may send warning signals to a display to indicate that a problem may exist.

11 Claims, 6 Drawing Sheets

AXLE TEMPERATURE MONITOR

BACKGROUND OF THE INVENTION

The invention relates to a method of monitoring the temperature of axles to determine the physical condition of the axles. The axle temperatures are used to indicate potential physical damage to the axles.

Vehicle axles require lubrication for proper performance, maintenance, and safe use of the axles. When a leak occurs in an axle housing that contains the lubricant, the temperature of the axle and the remaining oil increases which, in turn, may lead to physical failure of the axle. Additionally, when an axle has endured severe physical treatment or abuse, the temperature of the axle also increases. Both situations, low level of the oil in the axle housing and excessive physical abuse to the axle, lead to potential physical damage to the axle.

Presently, to diagnose the physical condition of an axle, the driver of the vehicle is required to routinely check the oil level in the axle housing. A low level is indicative of a leak within the housing which would require repair of the housing and replacement of oil. By checking the level, the driver makes a determination as to the physical condition of the axle. In situations where the level is low, the driver must determine whether the respective axle has experienced excessive conditions which may lead to failure of or damage to the axle during further use of the vehicle. In situations where the lubricant level is not low, the driver must still determine whether the axle has endured physically abusive conditions, which could also lead to failure of or damage to the axle during further use of the vehicle.

The current method of routinely checking the level of axle housings is somewhat time consuming. This current method requires the driver to intermittently and manually look towards the hub to check the level of the oil. A considerable amount of time is usually taken to make this determination.

Additionally, in many situations, this current method is inaccurate because it relies on the driver's judgment regarding axle conditions. As stated, the level of oil is only one indication of probable failure of the axle. Moreover, in many circumstances, the driver is not technically trained in determining the physical condition of the axle.

SUMMARY OF THE INVENTION

In a disclosed embodiment of the invention, a method of monitoring the temperature of axles is used to determine the physical condition of the axles. The present invention eliminates the need for the driver of the vehicle to physically check the level of the oil in each axle housing to determine the physical condition of each axle. Instead the driver can check the physical condition of the axles while operating the vehicle. This provides a more time efficient, accurate, and safe way to monitor the physical condition of the axles of a vehicle.

The present invention includes a method of monitoring the temperature of axles, which generally comprises reading temperatures from the axles of a vehicle, sending temperature signals of the read temperatures, receiving the temperature signals, performing computations of the read temperatures, comparing the computations with expected temperatures, and sending warning signals when necessary. A temperature sensor may be used to read temperatures of the axles and send temperature signals.

The temperature signals may be sent to a control which performs the computations and compares the computations with expected temperatures. Moreover, the control may send warning signals to a display, indicating the physical condition of the axles.

Alternatively, the temperature signals may be sent directly to the display from which the driver may determine the temperature status and physical condition of the axles.

In yet another example of the present invention, the temperature signals may be stored in the temperature sensor from which, at a later time, the temperature signals may be taken for analysis.

These and other features of the present invention can be understood from the following specifications and drawings.

DETAILED DESCRIPTION OF A PREFERRED EMBODIMENT

Figure 1:
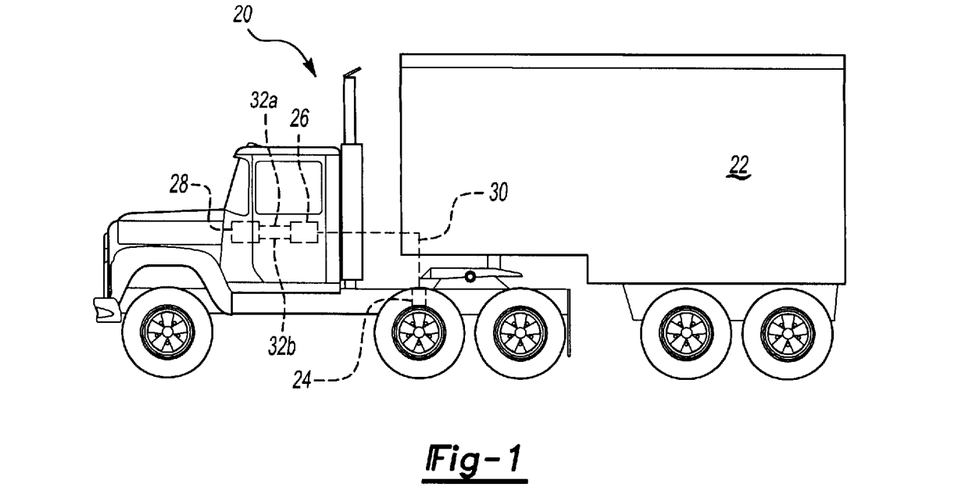
FIG. 1 is a schematic view of one system incorporating the present invention.

FIG. 1 shows a system 20 incorporating an embodiment of the present invention. The method of this invention involves monitoring the temperature of an axle to determine the physical condition of the axle of a vehicle 22 by using a temperature sensor 24, control 26, and a display 28.

The temperature sensor 24 is shown schematically associated with at least one axle on the vehicle. Preferably sensors are provided on each. In this embodiment, the temperature sensor 24 reads temperatures of the axle and sends temperature signals 30 representing the read temperatures to the control 26. The sensor 24 periodically takes temperature readings. The sensor 24 may be any suitable device that can read temperature and send signals representing the read temperatures. The medium for sending signals representing the read temperatures may be any suitable medium, such as electrical wire, radio frequency (RF) signals, or the like.

In this embodiment, the control 26 contains prestored expected temperatures of the respective axle from which temperatures are read. As will be described in greater detail below, the expected temperatures may include threshold temperature, threshold number, threshold mean temperature, threshold standard deviation, threshold moving average, and threshold peak temperature.

The control 26 receives the signals 30 from the sensor 24, performs computations based on the read temperatures, and compares the computations with the expected temperatures for the axle. If the read temperatures exceed the expected temperatures of the axle, then warning signals 32a, 32b may be sent from the control 26 to the display 28 indicating that the axle may have a problem. Additionally, if the read temperatures of one axle differ beyond an expected value from another axle, then warning signals may also be sent to the display 28.

It is to be noted that the invention is neither concerned with how temperature is read nor by what medium in which signals are sent or retrieved; rather, it is concerned with reading temperatures of axles such that they may be compared with expected temperatures.

The control 26 may be any suitable device known in the art which can receive temperature signals, perform computations based on the signals, and compare the computations with expected temperatures of the axle. For example, a central processing unit such as a computer that is programmed to perform such tasks may be used. Furthermore, the display 28 may be any suitable device known in the art that can receive warning signals and indicate a problem. For example, a computer monitor, a light emitting device, or a sound emitting device may be used.

Figure 2:
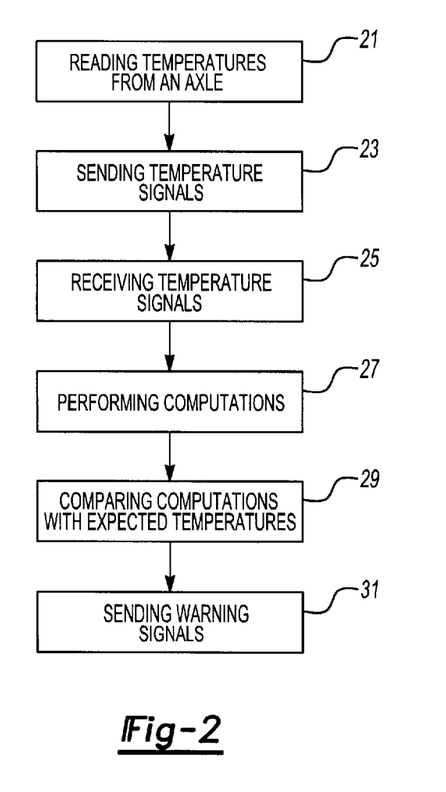
FIG. 2 is a flow chart of an embodiment of the present invention implemented by the system in FIG. 1.

FIG. 2 is a view of a flow chart that may be implemented by system 20 shown in FIG. 1. As shown in FIG. 2, an example of the invention could be described as reading temperatures from axles in step 21, sending temperature signals of the read temperatures in step 23, receiving temperature signals in step 25, performing computations of the read temperatures in step 27, comparing the computations with expected or threshold temperatures in step 29, and sending warning signals when a problem may be present in step 31.

Figure 3A:
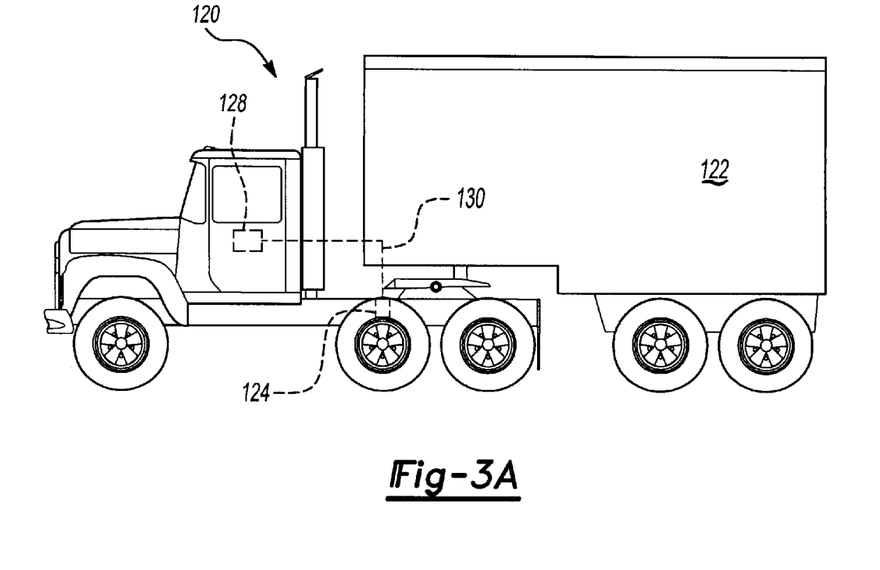
FIG. 3A is a schematic view of another system incorporating the present invention.

FIG. 3A shows another system 120 that incorporates the present invention. The system 120 of this embodiment uses a temperature sensor 124 and a display 128.

The temperature sensor 124 is shown schematically associated with at least one axle of the vehicle 122. Again, preferably the sensors are associated with each axle. In this embodiment, the temperature sensor 124 reads temperatures of the axles and sends temperature signals 130 representing the read temperatures to the display 128. The display 128 receives the signals 130 from sensor 124 and indicates the most recent temperatures of the axles. The driver may then, during operation of the vehicle, interpret the temperatures accordingly.

The sensor 24 may be any suitable device that can read temperature and send signals representing the read temperatures. The medium for sending signals representing the read temperatures may be any suitable medium, such as electrical wire, radio frequency (RF) signals, or the like.

Figure 3B:
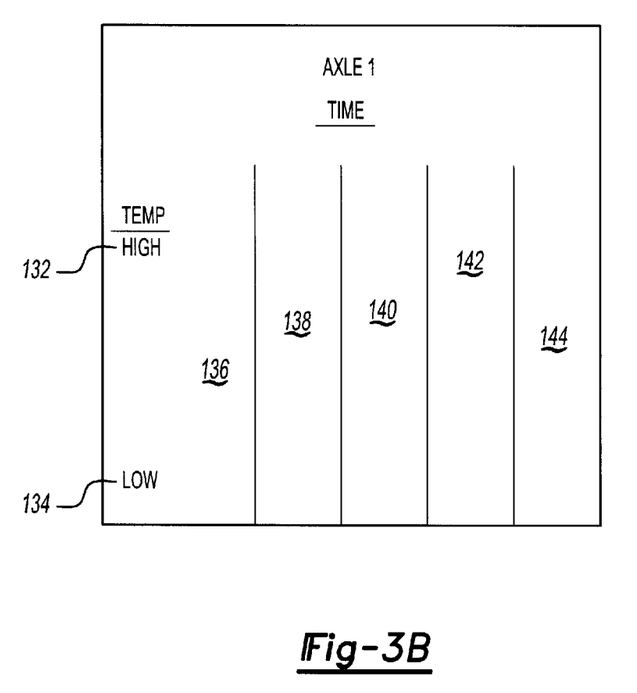
FIG. 3B is a view of a display which may be implemented in the system in FIG. 3A.

As it can be seen in FIG. 3B, the display 128 may indicate a continual chronology of temperatures 136,138,140,142, 144 of a particular axle or several axles. The display may be a light emitting display which emits lights across the display representing the chronology of temperatures in accordance with the magnitude of the temperature and the time of sampling. As the display 128 may also show a numeric value of each temperature, the light emitting display allows the driver to quickly check the display 128 and continue his or her attention on the operation of the vehicle 122. If the display 128 shows an exceedingly high 132 or low 134 temperature, then the driver may decide to stop the vehicle, perform calculations, and/or physically check the axles in question.

Additionally, if the display shows an exceedingly high temperature difference between the temperatures of two different axles, then the driver may also find it necessary to stop the vehicle. The display 128 may indicate temperatures by any other suitable means that allow the driver to analyze temperature readings in order to determine the physical condition of the axles. Thus, the display 128 may be any suitable device known in the art that can receive the temperature signals and indicate temperatures represented by the temperature signals.

Figures 4, 5:
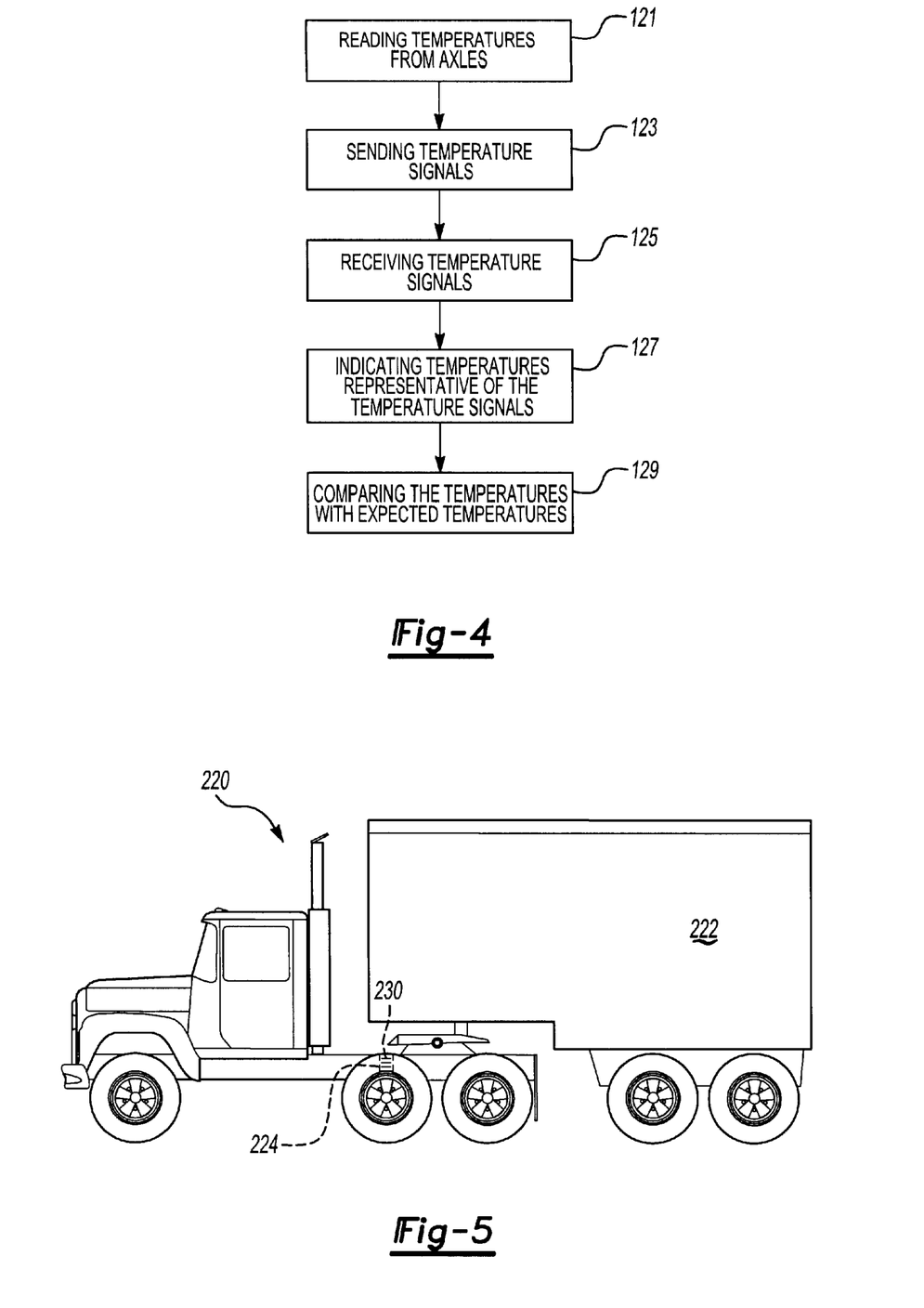
FIG. 4 is a flow chart of another embodiment of the present invention implemented by the system in FIG. 3A.
FIG. 5 is a schematic view of yet another system incorporating the present invention.

FIG. 4 is a view of a flow chart that may be implemented by system 120 in FIG. 3A. As shown in FIG. 4, an example of the invention could be described as reading temperatures from axles in step 121, sending temperature signals representing the read temperatures in step 123, receiving temperature signals in step 125, indicating temperatures representative of the temperature signals in step 127, and comparing the temperatures with expected temperatures in step 129.

FIG. 5 shows yet another system 220 incorporating another embodiment of the present invention. The method of this invention also involves monitoring the temperature of axles. The system 220 of this embodiment uses a temperature sensor 224.

The temperature sensor 224 is shown schematically associated with at least one axle of the vehicle 222. Again, preferably each axle has a sensor. In this embodiment, the temperature sensor 224 reads temperatures of the axles and stores temperature signals 230 representing the read temperatures which may be retrieved at a later time. At the later time, the driver or service person may retrieve the temperature signals 230, perform computations with respect to the read temperatures, and compare the computations with expected temperatures of the axles or expected temperature differences between axles.

The temperature sensor 224 may be any suitable device known in the art that can read temperatures and store temperature signals representing the read temperatures such that they may be retrieved at a later time. For example, a Dallas Semiconductor Temperature Sensor with memory capabilities or the like may be used.

Figure 6:
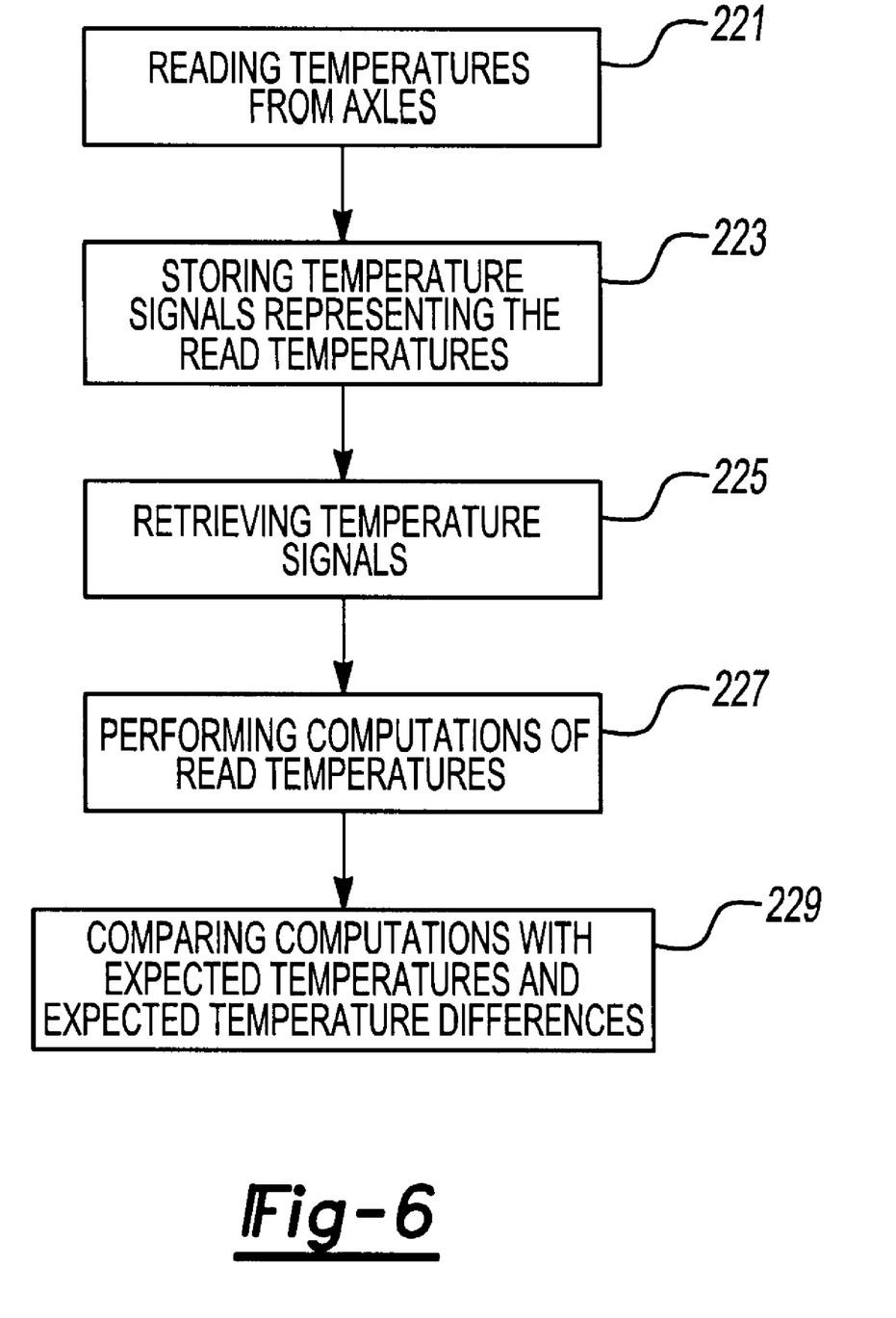
FIG. 6 is a flow chart of yet another embodiment of the present invention implemented by the system in FIG. 5.

FIG. 6 is a view of a flow chart of an embodiment of the present invention that may be implemented by system 220 shown in FIG. 5. As it can be seen in FIG. 5, an example of the invention could be described as reading temperatures from axles in step 221, storing temperature signal representing the read temperatures in step 223, retrieving the temperature signals in step 225, performing computations of the read temperatures in step 227, and comparing the computations with expected temperatures in step 229.

Figure 7A:
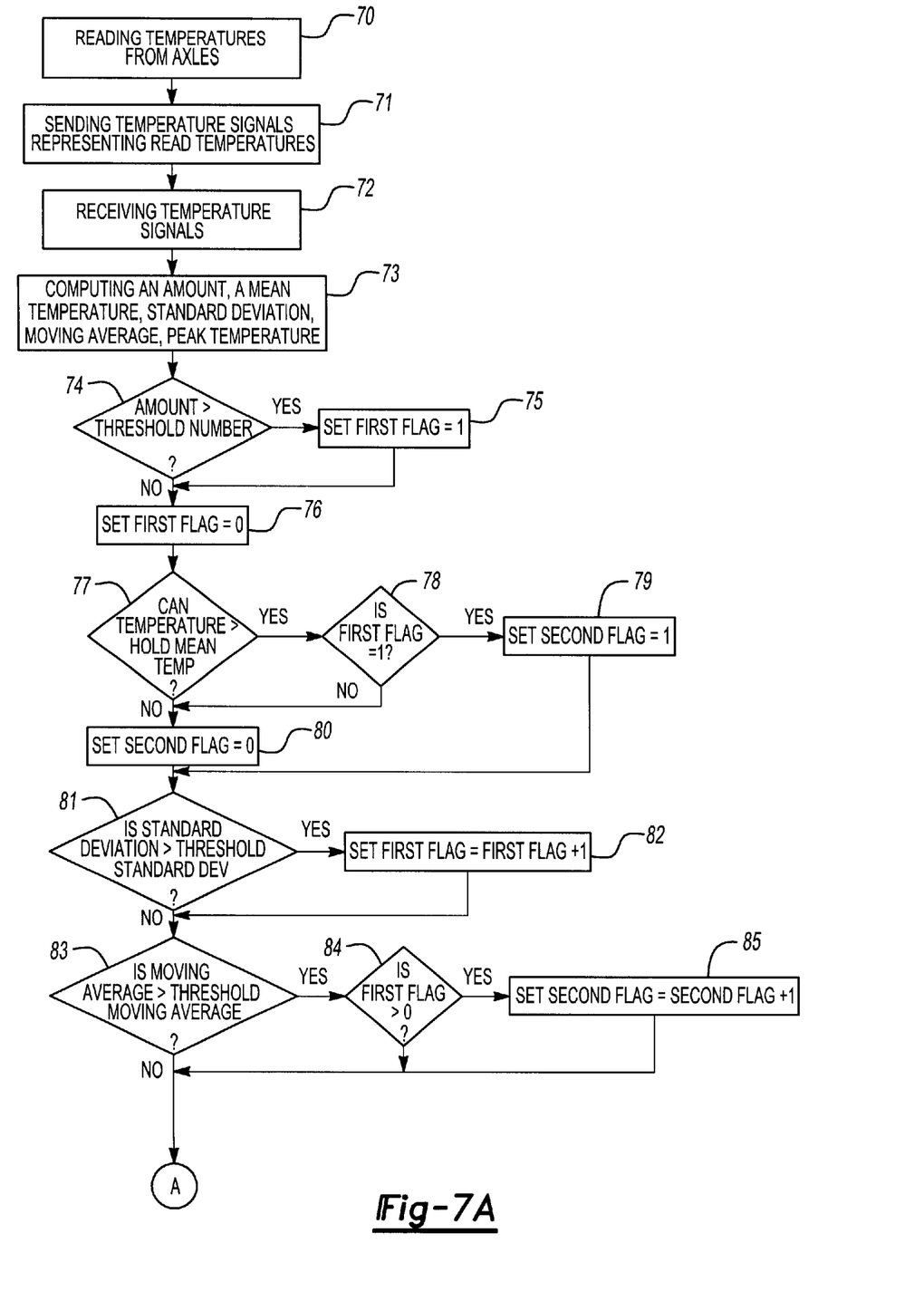
FIG. 7 is another flow chart of the embodiment of the present invention implemented by the system in FIG. 1.
Figure 7B:
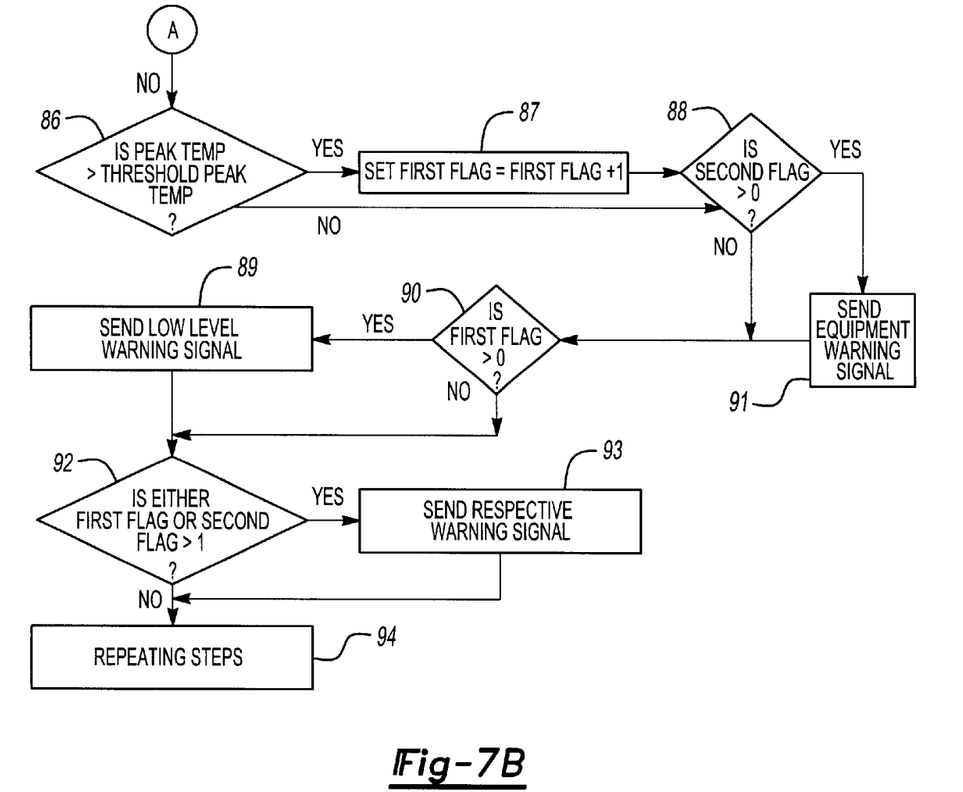

FIG. 7 is a view of a flow chart that may be implemented by system 20 shown in FIG. 1. As it can be seen in FIG. 6, steps 70 and 71 include reading temperatures from axles and sending temperature signals representing read temperatures. As stated above, the temperature sensor 24 may be used to read the temperatures and send temperature signals 30 to the control 26.

The remaining steps shown in FIG. 7 include receiving temperature signals, performing computations, comparing the computations with expected temperatures and sending warning signals when necessary. More specifically, the control 26 may receive the read temperature signals 30 from the sensor 24 in step 72; perform computations based on the read temperatures in step 73; compare the computations with the expected temperatures in steps 74, 77, 81, and 83; and 86, and send warning signals in steps 89, 91, and 93.

In this embodiment, the control 26 contains prestored expected temperatures of the respective axles from which temperatures are read. As stated above, the expected temperatures may include a threshold temperature 34, a threshold number 36, a threshold mean temperature 38, a threshold standard deviations 40, a threshold moving average 42, and a threshold peak temperature 44. The threshold temperature 34 is defined as a high temperature for the axle which is sufficiently high that it indicates a problem with the axle. The threshold number 36 is the maximum allowable number of read temperatures that may exceed the threshold temperature 34. That is, the total times the threshold number is exceeded are counted for a period of time. The threshold number is a maximum number of such exceeded temperatures in a preset period of time. This number eliminates short term singular "false problems" that could be due to an anomaly instead of a problem.

The threshold mean temperature 38 is a high temperature compared to read temperature information by dividing the sum of the read temperatures by the number of the read temperatures. The threshold standard deviation 40 is a quantity compared to read temperature information measured from the spread of the distribution from the mean temperature calculations. The threshold moving average 42 represents the maximum allowable average of read temperatures, where a fixed number of previous read temperatures are replaced in time with more recent read temperatures. The threshold peak temperature 44 is the maximum allowable temperature of the read temperatures. Each of the expected temperatures varies according to the type of axle of the vehicle.

It is to be noted that the invention does not focus on any particular axle, an expected temperature of an axle, or an expected temperature difference between axles; rather, it uses the expected temperatures and expected temperature differences as basis in comparing computations of the read temperatures to determine the physical condition of axles. Additionally, the computations and the steps discussed in this or any embodiment are not set out to limit the scope of the invention; rather, the computations and steps are simply provided to demonstrate a preferred way that the physical condition of axles may be determined through this invention. Thus, other additional or substitute computations and steps utilized are within the inventive scope.

There are numerous ways of determining the physical condition of axles based on the temperature of the axles. In this embodiment, the control 26 stores the temperature signals 30, and first computes an amount 46, a mean temperature 48, a standard deviation 50, a moving average 52, and a peak temperature 54 in step 73. The amount 46 represents the number of times the threshold temperature 34 is reached in a preset period of time. The mean temperature 48 is defined by dividing the sum of the read temperatures by the number of read temperatures. The standard deviation 50 is a quantity which measures the spread of the distribution from the mean temperature 48. The moving average 52 is the average of the past x read temperatures, where a fixed number, (x), of previous read temperatures are replaced in time with more recent read temperatures. The peak temperature 54 is defined by the highest temperature of the read temperatures.

Applicant has also recognized that certain diagnostic information can be developed depending on which features are experienced in the read temperatures. The abuse problem will tend to have a greater range of temperatures than the oil problem might have. The oil problem will tend to be more of a constant high temperature, rather than a spread of high temperature ranges. As will be explained below, this will allow an operator to perform diagnostic information that might pinpoint an identified problem.

Next, control 26 compares these computations with the expected temperatures. Specifically, the control 26 compares the amount 46 with the threshold number 36 in step 74. If the amount 46 is greater than the threshold number 36, then the control 26 sets a first flag 56 equal to 1 in step 75. If not, then the control sets the first flag equal to 0 in step 76.

The control 26 compares the mean temperature 48 with the threshold mean temperature 38 in step 77. If the mean temperature 48 is greater than the threshold mean temperature 38, then the control 26 determines whether the first flag 56 equals 1 in step 78. If the first flag 56 equals 1, then the control 26 sets a second flag 58 equal to 1 in step 79. If the first flag 56 does not equal 1, then the control 26 sets the second flag 58 equal to 0 in step 80.

The control 26 compares the standard deviation 50 of the read temperatures with the threshold standard deviation 40 in step 81. If the standard deviation 50 of the read temperatures is greater than the threshold standard deviation 40, then the control 26 sets the first flag 56 equal to the first flag+1 in step 82. The system then moves into step 83 regardless of the answer at step 81.

The control 26 compares the moving average 52 of the read temperatures with the threshold moving average 42 in step 83. If the moving average 52 is greater then the threshold moving average 42, then the control 26 determines whether the first flag 56 is greater then 0 in step 84. If the first flag 56 is greater than 0, then the control 26 sets the second flag 58 equal to the second flag+1 in step 85.

The control 26 next compares the peak temperature 54 of the read temperatures with the threshold peak temperature 44 in step 86. If the peak temperate 54 is greater than the threshold peak temperature 44, then the control sets the first flag to first flag+1. Regardless of the answer at box 86, the control moves to step 91. The control also determines whether the second flag is greater than 0 in step 88. If the second flag 56 is greater then 0, then the control 26 sends an equipment warning signal 32a to the display 28 indicating that there may be a problem with the respective axle as shown in step 91. As will be explained, the identified problem probably relates to potential physical damage to the axle likely due to low level of oil which may lead to failure of the axle.

Next, the control 26 determines whether the first flag 56 is greater than 0 in step 90. If so, then the control 26 sends a low level warning signal 32b to the display 28 indicating that there may be a problem with the respective axle or the housing containing oil around the axle in step 89. As will be explained below, the identified problem probably relates to potential physical damage to the axle likely due to abusive treatment which leads to failure of the axle.

The control then determines whether the first flag 56 or the second flag 58 is greater than 1 in step 92. If the flag 56 is greater than 1, then the control 26 sends the equipment warning signal 32a to the display 28 in step 93. If the second flag 58 is greater than 1, then the control 26 sends the low level warning signal 32b to the display 28 which indicates the respective warning signal in step 93.

It is to be noted that the invention is neither concerned with the type of warning signal nor on the medium in which the signals travel; rather, the invention is concerned with sending a signal to any suitable display such that the display may indicate a problem with the respective axle. Visual, audio or combinations of signals may be used.

Then, control 26 repeats the previous steps of receiving the read temperatures from the sensor 24, performing computations, comparing the computations with the expected temperatures, and sending signals when necessary in step 94.

As an example, the indications set in boxes 75 and 82 are indicative of abuse or damage. These are indicative of a wider range of problem temperatures. The temperature will tend to fluctuate more greatly with damage or abuse then it will with a low oil problem. On the other hand, boxes 79 and 85 are indicative of a low oil problem. Again, with further refinement of the system specific diagnostic points can be developed.

Although a preferred embodiment has been disclosed, a worker in this art would recognize that modifications come within the scope of this invention. Therefore, the following claims should be studied to determine the true scope of the present invention.

What is claimed is:

1. A method of monitoring temperatures of an axle to determine if the axle is experiencing a problem, the method comprising:
   a. reading a plurality of temperatures of the axle taken over period of time;
   b. comparing said read temperatures with an expected temperature information of said axle wherein said expected temperature information includes a threshold temperature, a threshold number, a threshold mean temperature, a threshold standard deviation, a threshold moving average, and a threshold peak temperature of said axle; and
   c. if said read temperatures differ from said expected temperature, then indicating said axle is experiencing a problem.

2. A method as in claim 1, wherein said indicating of step c relates to a display in a vehicle cab.

3. A method as recited in claim 1, wherein said step of reading further includes:
   storing temperature signals representing said read temperatures; and
   retrieving said stored temperature signals.

4. A method of motoring temperatures of an axle to determine if the axle is experiencing a problem, the method comprising:
   a. reading a plurality of temperatures of the axle;
   b. counting the number of times a threshold temperature is reached by said read temperatures; comparing the number of times said threshold temperature is reached with a threshold number; if the number of times said threshold temperature is reached is greater than said threshold number, then setting a first warning; and
   c. if said read temperatures differ from an expected temperature information, then indicating said axle is experiencing a problem.

5. A method as recited in claim 4, further including the steps of:
   f. calculating a mean temperature of said read temperatures;
   g. comparing said mean temperature to a threshold mean temperature;
   if said mean temperature is greater than said threshold mean temperature, then:
      determining whether said first warning is set;
      if said first warning is set, setting a second warning.

6. A method as recited in claim 5, further including the steps of:
   h. calculating a standard deviation of said read temperatures;
   i. comparing said standard deviation of said read temperatures with a threshold standard deviation;
   if said standard deviation is greater than said threshold standard deviation, then setting a third warning.

7. A method as recited in claim 6, further including the steps of:
   j. calculating a moving average of said read temperatures;
   k. comparing said moving average of said read temperatures with a threshold moving average;
   if said moving average is greater than said threshold moving average, then:
      determining whether said first warning is set;
      it said first warning is set, then setting a fourth warning.

8. A method as recited in claim 7, further including the steps of:
   l. determining a peak temperature from said read temperatures;
   m. comparing said peak temperature with a threshold peak temperature;
   if said peak temperature is greater than said threshold peak temperature, then:
      determining whether said first warning is set;
      if said first warning is set, then signaling said read temperatures differ from said expected temperature information;
      if said first warning is not set, then:
         determining whether said third warning is set;
         if said third warning is set, then signaling said read temperatures differ from said expected temperature information;
         determining whether said second warning is set;
         if said second warning is set, then signaling said read temperatures differ from said expected temperature information;
         if said second warning is not set, then:
            determining whether said fourth warning is set;
            if said fourth warning is set, then signaling said read temperatures differ from said expected temperature information; and
   n. determining whether any warning is set; if both first and third warnings are set, then signaling said read temperatures differ from said expected temperature information;
   if both second and fourth warnings are set, then signaling said read temperatures differ form said expected temperature information.

9. A method of monitoring temperatures of an axle to determine if the axle is experiencing a problem, the method comprising:
   a. reading a plurality of temperatures;
   b. comparing said read temperatures with an expected temperature information of said axle; and
   c. if said read temperatures differ from said expected temperature information, then determining a number of differences between said read temperatures and said expected temperature information, and indicating said axle is experiencing a problem which is a low oil problem or a physical damage problem; wherein said read temperatures are monitored and used to discriminate between the low oil problem and the physical damage problem.

10. A method as recited in claim 9, wherein said method includes the steps of identifying the range of read temperatures, and making the determination of whether the problem is a low oil problem or a damage problem at least in part by reviewing the standard deviation of the read temperatures.

11. A method as recited in claim 9, wherein the comparing step includes defining a threshold number of occurrences within a predetermined period of time, and eliminating read temperatures which differ from said expected temperature information if said number of differences does not exceed the threshold number within a predetermined period of time to eliminate an anomaly being used as an indication of the problem.

* * * * *